Jan. 20, 1959 H. T. BACKHOUSE 2,869,867
SHEET SEPARATING MACHINE
Filed Dec. 21, 1954 12 Sheets-Sheet 2

Inventor:
Hadley Townsend Backhouse
By
Churchill, Rich, Weymouth & Engel
Attorneys Jan. 20, 1959  H. T. BACKHOUSE  2,869,867
SHEET SEPARATING MACHINE
Filed Dec. 21, 1954  12 Sheets-Sheet 4

Inventor:
Headley Townsend Backhouse
By
Churchill, Rich, Weymouth & Engel
Attorneys Jan. 20, 1959  H. T. BACKHOUSE  2,869,867
SHEET SEPARATING MACHINE
Filed Dec. 21, 1954  12 Sheets-Sheet 5

Fig. 8.

Inventor:
Headley Townsend Backhouse
By
Churchill, Rich, Weymouth & Engel
Attorneys Jan. 20, 1959  H. T. BACKHOUSE  2,869,867
SHEET SEPARATING MACHINE
Filed Dec. 21, 1954  12 Sheets-Sheet 8

Inventor:
Hadley Townsend Backhouse
By
Churchill, Rich, Weymouth & Engel
Attorneys Jan. 20, 1959 H. T. BACKHOUSE 2,869,867
SHEET SEPARATING MACHINE
Filed Dec. 21, 1954 12 Sheets-Sheet 9

Fig.15.

Inventor:
Headley Townsend Backhouse
By
Churchill, Rich, Weymouth & Engel
Attorneys Jan. 20, 1959    H. T. BACKHOUSE    2,869,867
SHEET SEPARATING MACHINE Filed Dec. 21, 1954    12 Sheets-Sheet 11

Inventor:
Headley Townsend Backhouse
By
Churchill, Rich, Weymouth & Engel
Attorneys

Fig.23.

United States Patent Office 2,869,867
Patented Jan. 20, 1959

2,869,867

SHEET SEPARATING MACHINE

Headley Townsend Backhouse, Nassau,
Bahamas, British West Indies

Application December 21, 1954, Serial No. 476,703

Claims priority, application Great Britain March 24, 1954

12 Claims. (Cl. 271—26)

The invention relates to machines for producing a succession of individual sheets (e. g. in the form of a stream of partly overlapping sheets) from a pile (e. g. in the form of an upright stack or a fanned out bank) of flexible sheets by separation of the sheets one by one from the top of the pile and forwarding the separated sheets from the pile. The sheets may be of paper, card or the like or they may be of metal or plastic.

The invention is concerned wtih machines for the above purpose of the kind in which one edge portion of each uppermost sheet in turn of the pile is first lifted from the pile and the sheet is then forwarded from the pile by, or under the control of, means gripping the lifted portion. Usually, after the edge portion of the sheet has been lifted, the remainder, or the bulk of the remainder, of the sheet is separated from the underlying pile by an air blast directed between the lifted portion and the pile. It is also usual that the sheet is forwarded substantially in its own plane but it may be removed upwardly. The edge portion which is lifted may be at the front or at the back of the sheet considered in relation to the direction of removal. The sheets may be forwarded to printing machines, or to cutting and creasing machines or to other machines operating on individual sheets.

It is convenient and customary to regard the period between the beginning of the first separating operation on one sheet (e. g. the direction of a blast of air against the side of the pile to blow up the sheets) and the beginning of the same operation on the next sheet as being represented by 360° or one revolution (i. e. one revolution of an actual or hypothetical part of the machine, such as a cam shaft controlling the machine operations, which rotates uniformly one revolution for each sheet which is separated) and the term "revolution" will be used herein to define that period.

The invention has, for its primary object, to increase the speed of practical operation of machines of the above kind.

To achieve a high operating speed it is desirable to employ a maximum portion of the revolution for the separation of the sheet (i. e. for lifting the sheet and blowing air beneath it), and more particularly it is desirable to delay for as long as is practicable the beginning of the forwarding operation. In such machines as at present constructed the limit to this delay is set by the fact that the lifting means move downwardly (i. e. in the reverse direction) along the path which they follow in lifting the sheets and consequently each lifted sheet must be forwarded in time to clear this path before the lifting means can be lowered to start work on the next sheet. Even if the lifting means operate quite close to the rear edge of the sheet the time necessary for the lifted sheet to move clear of the path (allowing for the acceleration required and the dimensions of the lifting means) is quite a substantial part of the available interval and this is especially so in the case of stream feeding where the rate of forwarding is low.

One feature of the machine provided by the invention is that the lifting means move rearwardly for the purpose of clearing the rear edge of the lifted sheet and begin their downward movement to engage the next sheet before, or during the initial part of the forwarding movement of the lifted sheet (i. e. the part of that movement required to uncover the portion of the underlying sheet to be engaged by the lifting means). The downward movement may be combined with a return forward movement or the two movements may be wholly or partly separate.

With the above arrangement it is no longer necessary to wait until the lifted sheet has been forwarded an appreciable distance before beginning to move the lifting means into position for operation on the next sheet.

Another feature of the machine provided by the invention is that it has a lifting gripper (or several such grippers) which engages and grips the edge portion of a sheet to be separated, rises carrying the edge portion of the sheet, transfers the edge portion so lifted to other gripping means and then moves outwardly (e. g. rearwardly), downwardly and inwardly (i. e. forwardly if the initial movement was rearward) around the edge of the lifted sheet to engage the next sheet beneath the said lifted edge portion.

With this feature the forwarding of the lifted sheet may be delayed until the lifting means have engaged and are ready to begin or have begun elevation of the next sheet.

The said other gripping means may be stationary suction grippers which hold the sheet for a period and then transfer the sheet to forwarding grippers.

Alternatively the said other gripping means may be forwarding grippers which hold the sheet for a period and then move forwardly with the sheet.

Another feature embodied in the machine provided by the invention is based on the appreciation that provided each step in the separating and forwarding can be, and is, effected on a different sheet in the succession for each revolution, it is not essential that all the steps be carried out on the same sheet in the same revolution and that by distributing the steps over two, or more, revolutions more time may be obtained in which to effect any particular step.

This feature is that the initial lifting of the edge portion of a sheet is effected in one revolution and the forwarding of the sheet is delayed until the next revolution.

When an air blast is used to effect the separation of the sheets, as mentioned above, it is found that, in machines as at present constructed and operated, the time interval required for the air to penetrate between the sheet and the pile is a limiting factor in the speed of operation of the machine. By allocating the lifting of the edge portion of the sheet and the forwarding to different revolutions, a longer period measured in degrees as above defined is obtained for the air blast to operate and consequently the speed of operation of the machine may be increased. The operation of the air blast may, for example, begin at an appropriate time in the first revolution and continue into the second revolution. Forwarding may start at the beginning of the second revolution or may be delayed to a later stage in the revolution (e. g. 400° after the begining of the separation of the sheet or even later) to obtain further time for operation of the air blast. Removal of the sheet should not however be delayed to such an extent that the sheet interferes with the lifting of the next sheet. In the following example the sheet is forwarded by the forwarding grippers at a low speed (about one-half of the speed at which the sheet is conveyed by the conveyor) and it is necessary to begin forwarding early in the second revolution in order to move the sheet out of the path of the lifting devices as they rise with the next sheet. If the sheet is forwarded at a greater speed (e. g. at the conveying speed) then the start of forwarding may be further delayed.

Another factor which at present limits the speed of operation is that if the edge portion of the sheet is lifted too quickly it sucks up with it the underlying sheet with the result that proper separation is not obtained and, for example, a stop foot to hold the underlying sheets cannot be inserted between the top sheet and the immediately underlying sheet. A further feature of the machine provided by the invention has for its object to overcome this difficulty and so of enabling a reduction in the time which must be allowed for lifting the edge portion of the sheet, to be effected.

This feature is that the machine comprises means for separating and raising corner portions at opposite ends of one edge (e. g. the back edge) of each uppermost sheet in turn, presser means operating beneath the raised corner portions for holding down at or near their corners the underlying sheets, and means for raising the remainder of the said edge from the underlying sheets while the sheets are held as aforesaid.

The machine may include means for blowing air between the raised edge of the uppermost sheet and the underlying sheet thereby to complete or assist in completing the separation of the sheet from the remainder of the pile and means for forwarding the separated sheet from the pile.

Preferably the machine includes means, which may be in the form of, or incorporate, a nozzle for directing the separating air as aforesaid, operating beneath the raised edge intermediate between the corner portions for holding down the underlying sheets. In one form of the machine the corner holding down means are raised from the pile during the separation and elevation of the corners and the intermediate holding down means are operative while the corner holding down means are so raised.

The means for separating and raising the corner portions may include intermittently operable air blasts directed onto the corners of the pile and arranged to fluff up the corners of the uppermost sheets. There may also be included suction grippers (e. g. of the collapsing type) arranged to engage the fluffed up corners of the uppermost sheet and operating in conjunction with stops which rest on the top of the pile or immediately above the top to restrict the portions fluffed up to the corners. The machine may also include means for raising the grippers and stops when the grippers have engaged the sheet thereby to raise the remainder of the edge as aforesaid.

It is also preferred that the machine includes secondary sheet gripping devices to which the raised edge of the sheet is transferred and which hold the edge of the sheet raised during the whole or a part of the operation of blowing the separating air. These secondary gripping devices, which may also be suction grippers, may operate partly to forward or to control the forwarding of the sheet from the pile. When such secondary gripping devices are provided the arrangement may be that the corner grippers are lowered beneath the raised sheet while it is so held, to begin operating on the next sheet and, to permit the corner grippers to be lowered without interference with the raised sheet, means may be included for effecting an initial movement of the grippers in a direction outwardly from the pile and for returning the grippers beneath the sheet. These means may be mechanically or pneumatically operated.

For the purpose of ensuring that the intermediate portions of the edge of the sheet do not sag to such an extent as to interfere with the operation of the separating air or the insertion of the intermediate holding means, the corner gripping means may be moved away from one another while gripping the sheet thereby to tauten the raised edge.

A specific construction of a machine according to the present invention, the operation of the machine and some modifications which may be effected to it, will now be described by way of example and with reference to the drawings herein in which.

The machine forming the subject of the example shown in Figures 1–14 is arranged to operate at the rear of an upright pile 30 of sheets and to forward the sheets from the front of the pile as a continuous stream of partly overlapping sheets. Adjacent each rear corner of the pile there is a corner separating and holding mechanism. The two mechanisms are similar in construction and operation and only one will therefore be described in detail.

The mechanism is carried by a main bracket 32 which is secured to two cross-bars 33, 34 above the pile 30 and the mechanical parts of the mechanism are operated by cams on a shaft 36 between the cross-bars.

Figures 1, 2:
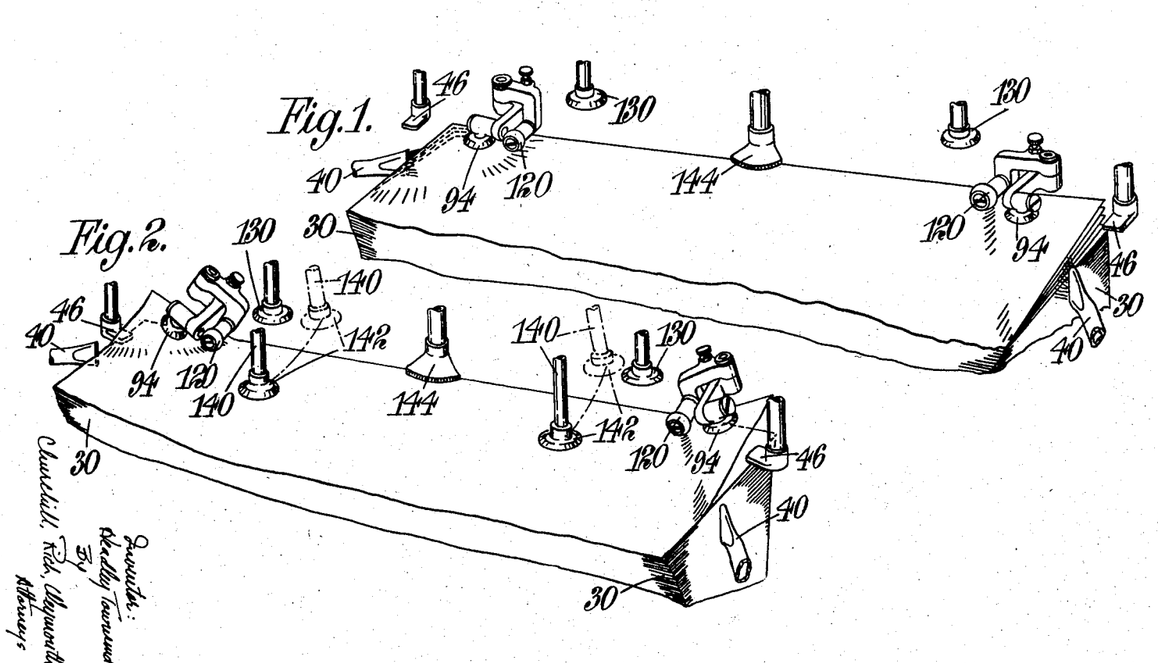
Figures 1–7 are diagrams illustrating the machine and successive operations in the separation and forwarding of one sheet and the separation of the next sheet.
Figure 8:
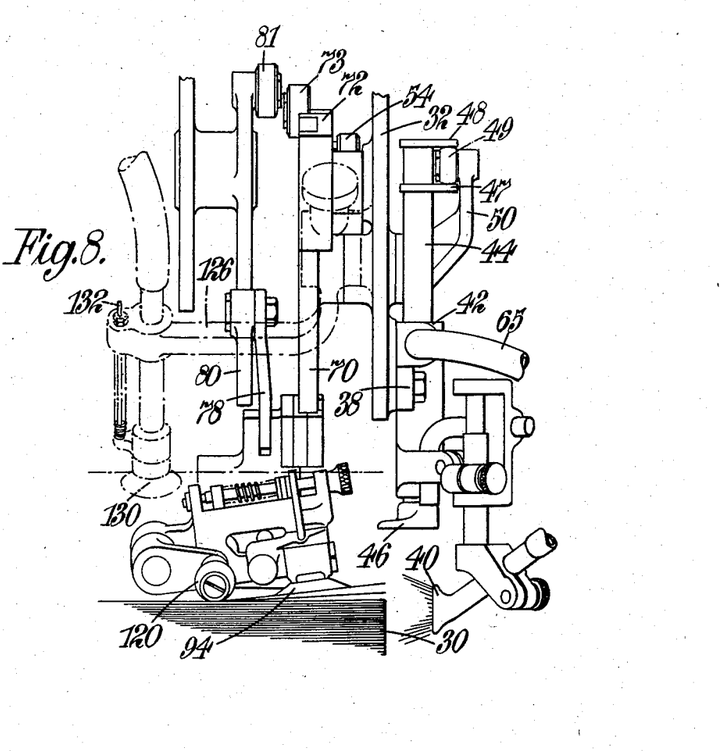
Figure 8 is a front view of the separating mechanism at one side of the machine.
Figure 9:
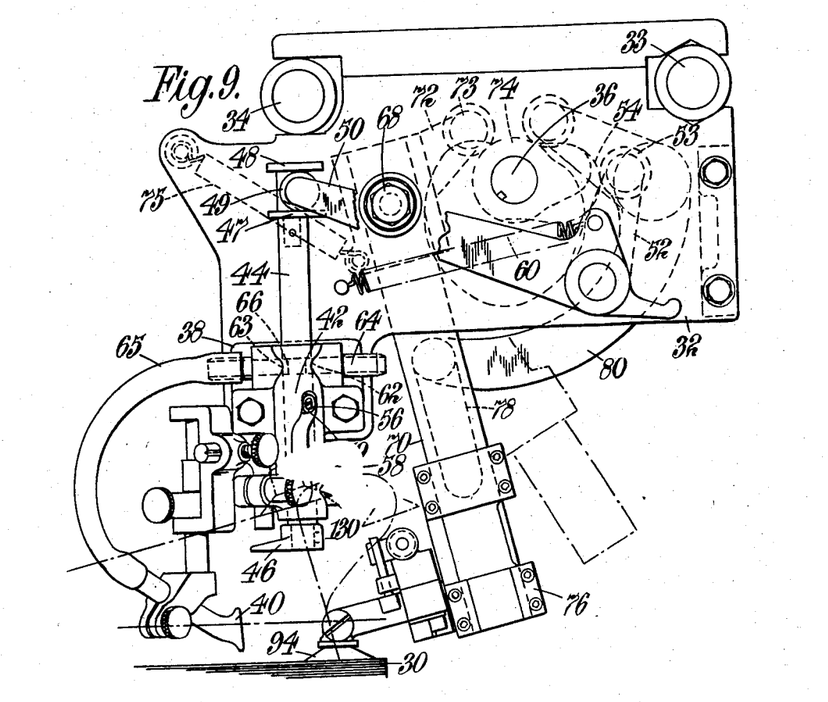
Figure 9 is a view from one side of the mechanism shown in Figure 8.
Figures 10, 13, 14:
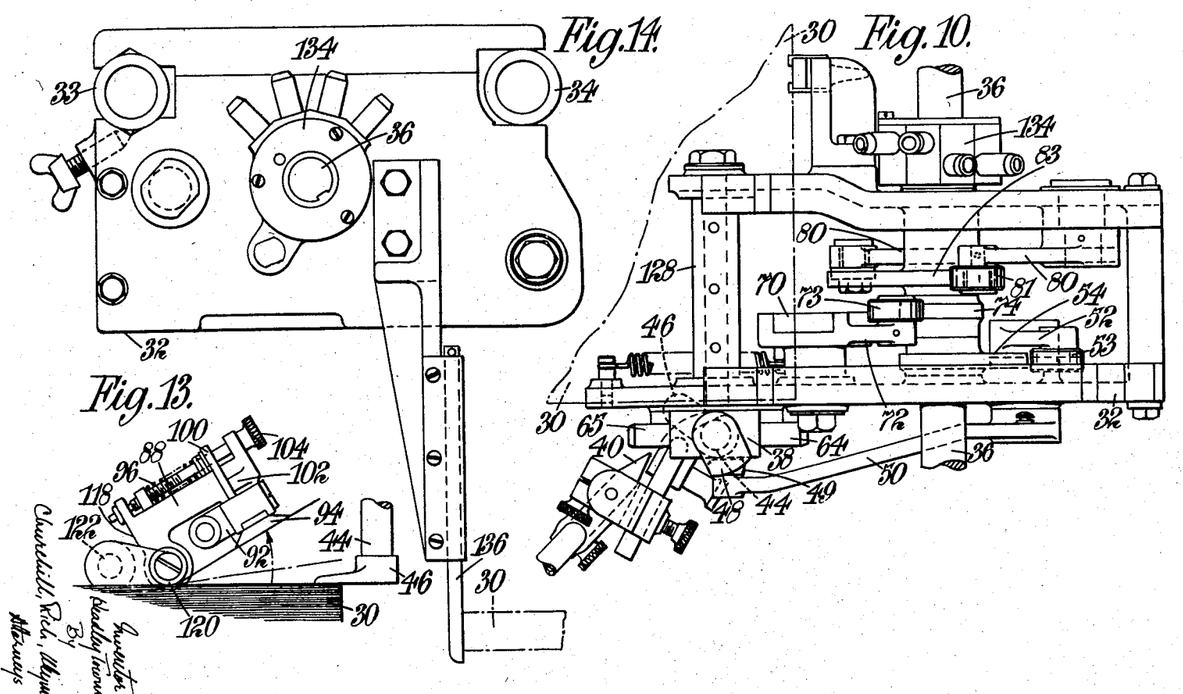
Figure 10 is a plan view of the mechanism.
Figure 13 is a front view showing the gripper in a position to which it is raised by suction.
Figure 14 is a view of the mechanism from the side opposite to that of Figure 9.

Secured to the main bracket 32 there is a subsidiary bracket 38 which carries an air blast nozzle 40 directed onto the side face of the pile 30 diagonally across the corner and arranged, when in operation, to fluff up the corners of the top sheets of the pile (see Figures 1 and 8 for example).

The subsidiary bracket 38 also provides a vertical guide 42 for a rod 44 having at its lower end a holding down foot 46. The foot extends laterally from the bottom of the rod, the rod being outside the compass of the pile. At its upper end the rod 44 has two collars 47, 48 between which is received a roller 49 on one arm of a bell-crank lever 50 of which the other arm 52 has a roller 53 which co-operates with a cam 54 on the shaft aforesaid, the arrangement being that rocking movement imparted to the bell-crank by the cam 54 effects up and down movements of the rod and foot 46. Intermediate in its length the rod 44 has a side roller 56 which runs in a slot 58 in the bracket 38. The lower part of the slot is vertical and the upper part (59) helical whereby during the first part of the upward movement the foot moves vertically and towards the end of the movement the foot is rotated to the outside of the compass of the pile (see Figure 1). The rod lies at the side of the pile and the foot, when lowered, seats on the pile near the corner (see Figure 2). A spring 60 urges the foot downwardly into pressure engagement with the pile.

Adjacent the upper end of the guideway for the rod 44 there are a pair of opposed ports 62, 63 connected respectively (by pipe connections 64, 65) to a source of compressed air and to the nozzle 40. The rod co-operates with these ports to constitute a valve controlling the air blast. When the foot is down the air is shut off but when the foot is raised to its maximum extent a groove 66 in the rod registers with the ports 64, 65 and air is admitted to the nozzle.

Dependent from a stub shaft 68 supported in the main bracket there is a guide bar 70 which forms an arm of a bell-crank lever of which the other arm 72 has a roller 73 which co-operates with a cam 74 on the cam-shaft 36 to effect, in conjunction with a spring 75, a rocking movement of the bell-crank lever, the lower end of the guide bar 70 moving towards and away from the rear edge of the pile. Guided on the bar there is a slide 76 which is coupled by a link 78 to a further bell-crank lever 80 having a roller 81 co-operating with a further cam 83 on the cam-shaft 36, the arrangement being that the cam operates to move the slide 76 up the guide bar 70 and a spring effects downward movements of the slide.

The slide 76 provides a bearing for a short fore and aft hollow shaft 86. This shaft carries two arms 88, 90. Pivoted to the free end of the arm 88 about an upright axis there is an arm 92 which carries at its free end a downwardly directed suction gripper 94. A spring 96 acting through a pivoted plate 98 urges a pin 100 on the arm 92 up to a stop 102 on the arm 88 and so tends to rotate the arm 92 and the gripper carried thereby outwardly towards the side of the pile (i. e. anti-clockwise as viewed in Figure 11). The loading of the spring 96 is adjustable by means of the screw 104. The arm 90 carries an adjustable stop screw 106 limiting downward movement of the arm and consequently of the suction gripper 94. Suction may be applied to the gripper 94 from a pipe connection 108, the hollow shaft 86 and passageways in the arms 88, 92.

There is also a suction connection from the shaft 86 through an upright passageway 110 leading to a horizontal inlet 111 into the upper end of a cylinder 112 formed in the slide 76. This cylinder contains a piston 113 to which is attached a pin 114 having a forked end 115 which fits over a projection 116 from the arm 88. The piston is spring urged downwardly. When suction is admitted through the pipe connection 108 to the cylinder 112 and the gripper 94 the spring is sufficient to retain the piston at the lower limit of its travel so long as the gripper mouth is open and the build up of full suction in the cylinder is prevented by air entering through the gripper. The gripper accordingly remains in its lowermost position as determined by stop 106, the gripper mouth then being at an angle corresponding to the angle to which the sheet corners will be fluffed up by the air blast. When the mouth is sealed by a sheet the suction may build up to the maximum extent in the cylinder and the gripper is then lifted by rotation about the axis of shaft 86 effected by the action of the suction to raise the piston 114.

Figures 11, 12, 18:
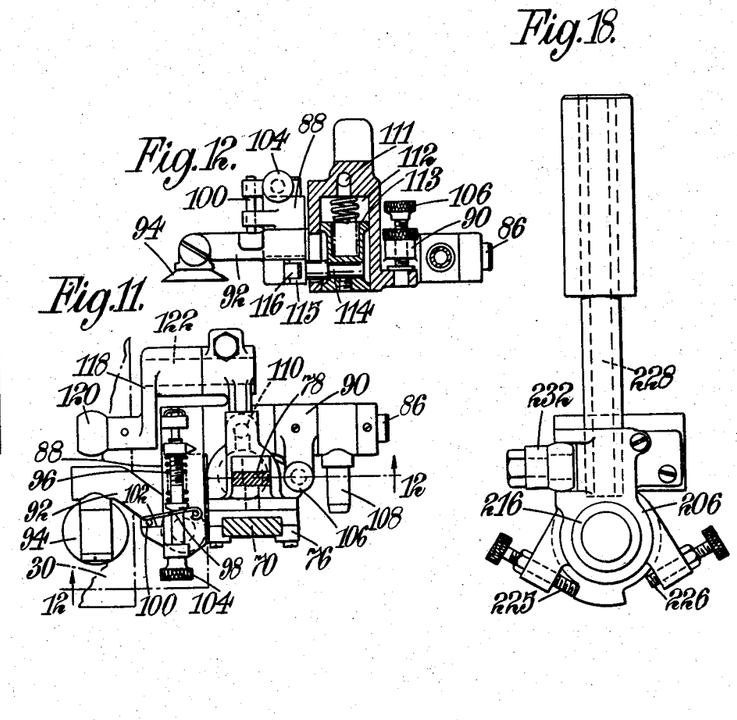
Figure 11 is a plan view showing details of the gripper operating mechanism and associated parts.
Figure 12 is a section on the line 12—12 in Figure 11.
Figure 18 is a front view of the mechanism shown in Figure 15 with the gripper and its support arm omitted.
Figure 15:
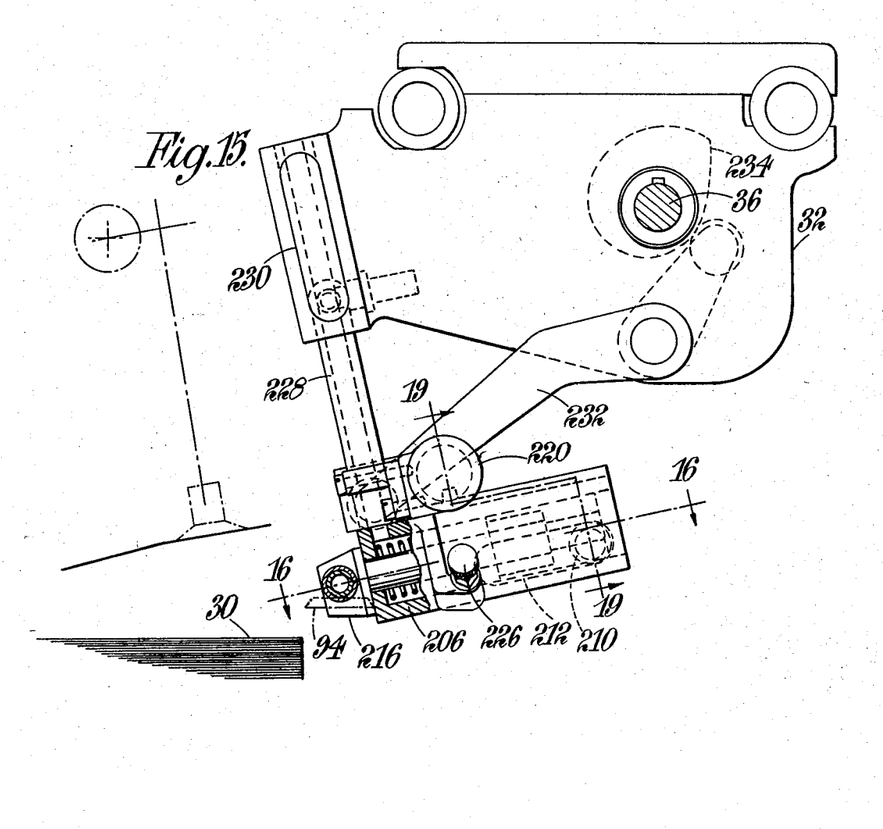
Figure 15 is a side view showing a modified construction.
Figure 16:
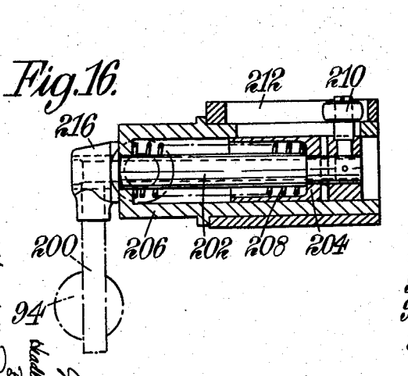
Figure 16 is a section on the line 16—16 in Figure 15.

The slide 76 also carries a crank 118 which carries a bead or stop 120 to seat on the top of the pile at the inside of the gripper 94. The bead may be close to the gripper as shown in Figure 11 or it may be adjusted to a position more remote from the gripper by rotation of the crank 118 through 180°. The bead may further be adjusted to an intermediate position by fitting the bead to an extension from the pin 122. These variations enable the angle through which the sheets are bent when the gripper is raised by suction, as above described, to be varied to suit sheets of different materials.

Supported by a bracket 126 adjustably attached to a cross-bar 128 on the main bracket 32 there is a dependent fixed suction gripper 130. This gripper is adjustable as to its height by a nut 132.

The main bracket 32 also carries a housing 134 for two rotary valves driven from the cam shaft 36. One valve controls the supply of suction to the separating grippers 94 and the other the supply of suction to the fixed gripper 130.

Dependent from the bracket 32 there is a gauge 136 for engagement with the rear face of the pile 30.

Dependent from a second rock shaft (not shown but supported in front of the cross bars) there is, adjacent each side of the pile, a swinging arm 146 (Figure 2) which carries at its lower end a secondary or forwarding suction gripper 142 which is arranged to receive a sheet from the adjacent fixed gripper 130 and to move with the sheet over the pile. A cam is provided for effecting the swinging movements of the arm. The sheet is finally removed by a tape conveyor or the equivalent to which the front edge of the sheet is forwarded.

At the center of the pile there is a single combined stop foot and nozzle 144 which is supported and arranged for up and down as well as in and out movements substantially as is the foot 71 described and shown in British specification No. 427,041. Alternatively there may be two or more such feet spaced apart across the back of the pile between the corners.

At the front of the pile there is a gripper 150 (Figure 7) which engages the underside of the front edge of the sheet after it has been forwarded a short distance from the pile and then moves forwardly to engage the front edge of the sheet between a driven roller 152 and a series of presser wheels 154 which serve to continue the forwarding of the sheet to a tape conveyor 156.

Figures 3, 4:
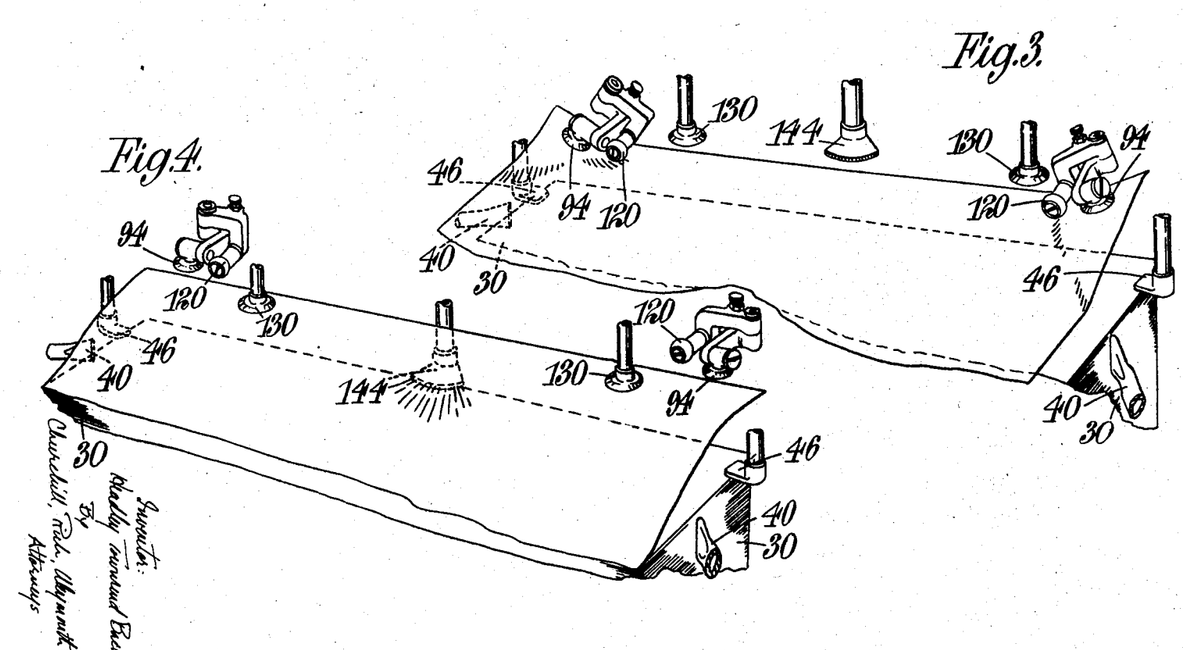
Figures 5, 6:
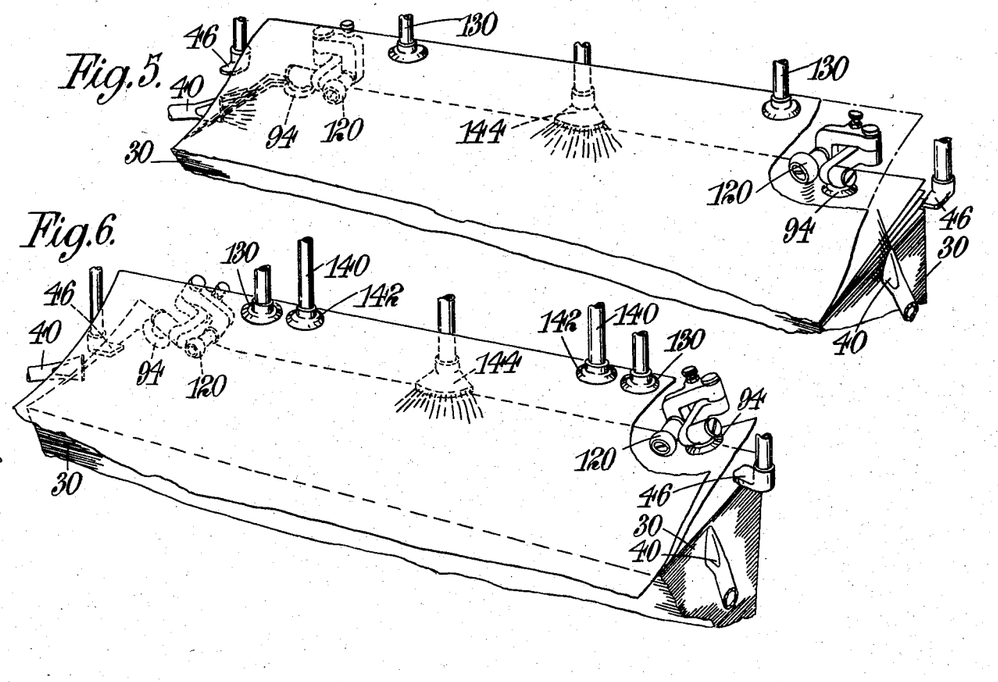
Figure 7:
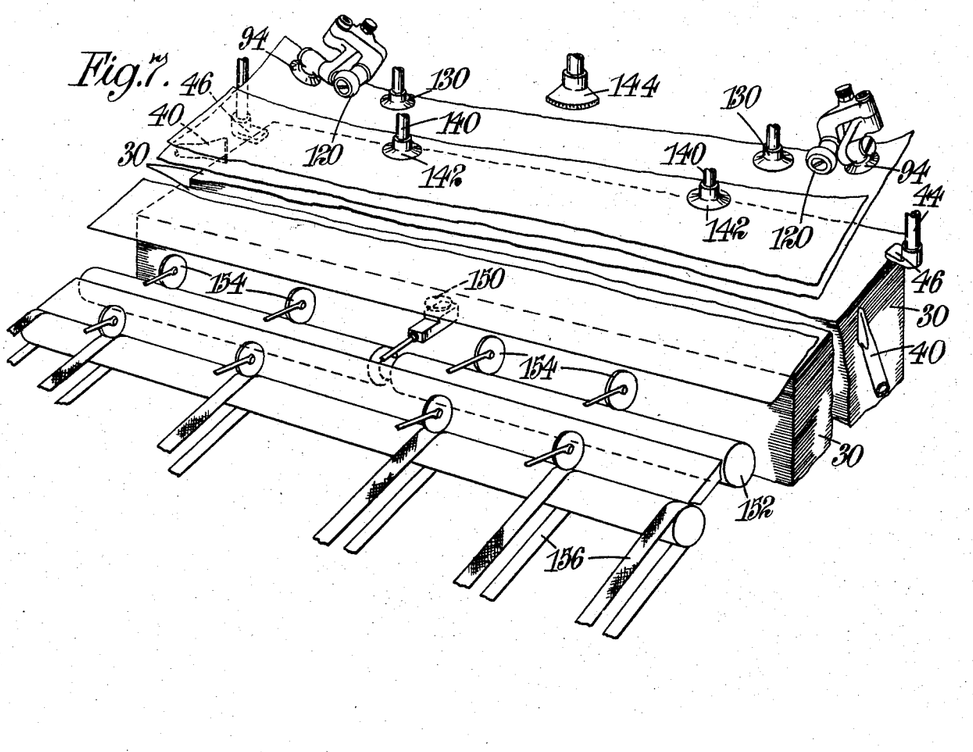

The operation of the machine to separate and forward a sheet will now be described. Starting from the position (Figure 1) in which the bead or stop 120 is resting on the top of the pile 30 with the suction gripper 94 held a short distance above the pile and the presser foot rod, which is rising with its foot 46, has just opened the air to the corner air blast nozzle 40, the air will fluff up the corners of the uppermost sheets, the area which is raised being restricted by the bead or stop 120. Suction has already been applied to the gripper 94 so that immediately the top sheet has been blown up into contact with the mouth of the gripper 94 it is seized thereby and the mouth sealed. The sealing of the mouth causes the suction to build up in the cylinder 112 which rotates the arm 92 and so lifts the gripper and the corner of the sheet held thereby, the sheet being bent around the bead 120. The foot 46 then descends cutting off the air blast, and moves inwardly under the lifted sheet to press down and hold the underlying sheets (Figure 2). The gripper 94 and its associated stop 120 are then raised by the slide 76 thereby to lift the whole of the rear edge portion of the sheet, it being appreciated that the opposite corner is being lifted simultaneously (Figure 3). The underlying sheets being held down, it is possible to lift the rear edge portion rapidly without disturbing the underlying sheets. When the edge has been raised the centre stop foot 144 moves inwardly and downwardly to seat on the underlying pile and to blow air under the raised edge of the top sheet (Figure 4). At about the same time as the air blast is started, the suction is applied to the fixed gripper 130 which engages the lifted portion of the sheet adjacent to the separating gripper 94 and holds the sheet in the raised position. The suction in the separating gripper 94 is released and the gripper is then moved with its stop backwardly clear of the sheet, downwardly and in under the sheet and then downwardly until the stop seats on the underlying pile. The path which the gripper follows is indicated by the arrows in Figure 9. During the downward movement of the separating gripper 94 and stop 120 the corner foot 46 moves upwardly and outwardly until, after the stop 120 has engaged the pile, it re-opens the corner air blast and the separation of the next sheet is begun (Figure 5). At this time or shortly thereafter suction is applied to the forwarding gripper 142 which takes the sheet from the fixed gripper 130, the suction to the latter then being turned off. The position is then as shown in Figure 6. At about this time the forwarding sucker 142 begins to move forward with the sheet. After the front edge portion of the sheet has been advanced clear of the pile it is engaged by the gripper 150 which continues the movement of the sheet, the grippers 142 releasing their grip.

Figure 23:
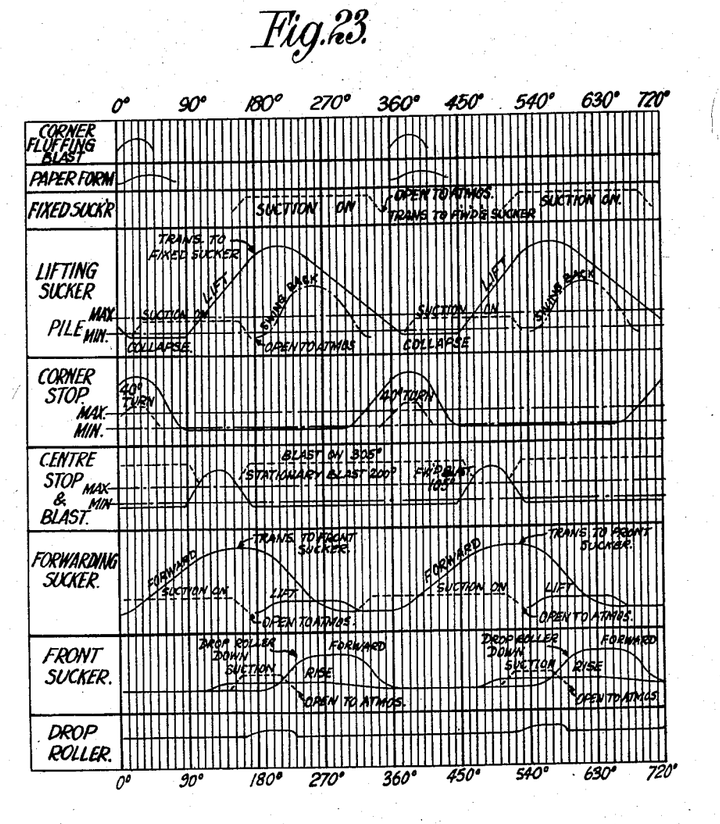
Figure 23 is a diagram illustrating the timing of the operation of the various parts of the machine.

Figure 23 is a diagram illustrating one particular timing of the operations of the machine. In the diagram 360° represents one revolution of the cam-shaft 36 which corresponds to the period between the beginning of an operation on one sheet (e. g. the beginning of the corner air blast) to the beginning of the same operation on the next sheet. In machines of the kind with which the invention is concerned means are usually provided for maintaining a substantially constant height relation between the separating mechanism and the top of the pile, as the pile is consumed, but variations in this relation are permitted within limits. Such variations affect the precise timing at which a device which is being lowered onto, or raised from, the top of the pile engages the pile or disengages therefrom and such variations are indicated in the timing diagrams in relation to the minimum and maximum height positions of the pile. It is to be appreciated that time is required for suction to build up at a gripper mouth after the opening of a suction valve or to die away after the closing of the valve. This time may be of the order of 20°.

It will be seen from Figure 23 that whereas one sheet is separated for each revolution of the cam shaft, the forwarding of the sheet does not begin until 360° after the separation of the sheet was begun and is not completed by the front sucker until about 590°. Further separating air blast from the centre nozzle begins at 160°, there is a period of 200° of air blast while the sheet is stationary before forwarding is begun and there is a further period of 105° of air blast while the sheet is being forwarded. The centre stop foot rises at about the same time as the corner grippers rise to lift the rear edge.

Some modifications in the construction of the above machine will now be described. In the first modification the fixed grippers are omitted and the forwarding grippers have a prolonged dwell at the rear end of their travel during which they hold stationary the lifted sheet while air is directed beneath it. For example the timing may be that the forwarding grippers reach the limit of their backward movement at 190° and take the sheet from the separating suckers between 190° and 210°. The forwarding grippers may then hold the sheet stationary until 260° and move forward between 260° and 440°, releasing the sheet at about 440° and then returning. The centre air blast may be on from 210° to 420°.

Figure 17:
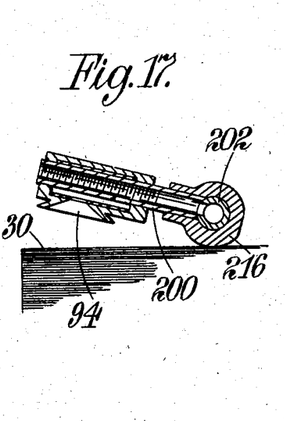
Figure 17 is a front view of the gripper and stop used in the construction shown in Figures 15 and 16.
Figure 19:
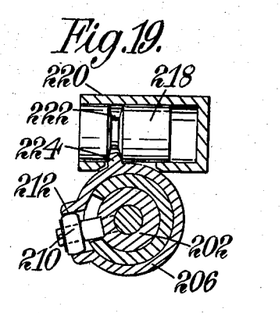
Figure 19 is a section on the line 19—19 in Figure 15.

Another modification (shown in Figures 15–19) relates to the means for effecting the backwards and forwards movements of the separating gripper 94. In this modification suction is employed for this purpose. The gripper 94 is, as before, carried on an arm but in the modified construction the arm 200 radiates from a piston rod 202 which extends in the fore and aft direction and carries at its rear end a piston 204 operating in a cylinder 206 which is closed in front of the piston. A spring 208 urges the piston rearwardly and the arrangement is that suction applied to the cylinder under the control of a separate valve moves the piston and gripper forwardly and the spring moves the parts rearwardly. The correct angular relation of the arm is maintained by a roller 210 on the side of an extension from the piston running in a guideway 212 in the cylinder. The end 216 of the piston rod serves as the stop foot (see Figure 17). The angular movements of the arm 200 to effect the initial lift of the corner of the sheet by the gripper 94 are effected by a separate suction operated piston 218 and cylinder 220 which operate to rotate, through a suitable angle about the axis of the cylinder axis 206, the cylinder 206 and the guideway 212 which it provides. The second or lifting cylinder 220, is connected in the suction lead to the gripper mouth and its piston 218 has a circumferential groove 222 in which is received a radial projection 224 on the cylinder 206. The axes of the two cylinders are at right angles and in separate planes. Adjustable stops 225, 226 limit the rotational movements of the cylinder 206. The cylinders are supported for up and down movement at an angle which approximately conforms to the natural angle of the upward movement of the rear edge of the top sheet, by means of a hollow rod 228 slidable in a guideway 230 on the main bracket by means of a bell-crank 232 and a cam 234 on the cam shaft 36. The rod also provides the suction connection to the cylinder 206. In the operation of the construction, as the cylinders move downwardly suction is applied to the cylinder 206 which moves the gripper 94 underneath the edge of a previously raised sheet. Suction is maintained in the cylinder until the gripper 94 has engaged the next sheet, raised the sheet and transferred it to the holding grippers. The suction is then released from the cylinder 206 and the gripper is moved rearwardly by the spring 208 clear of the raised sheet. The cylinders and gripper are then lowered until the gripper is beneath the edge when suction is re-applied to the cylinder and the gripper again moves inwardly.

Figure 20:
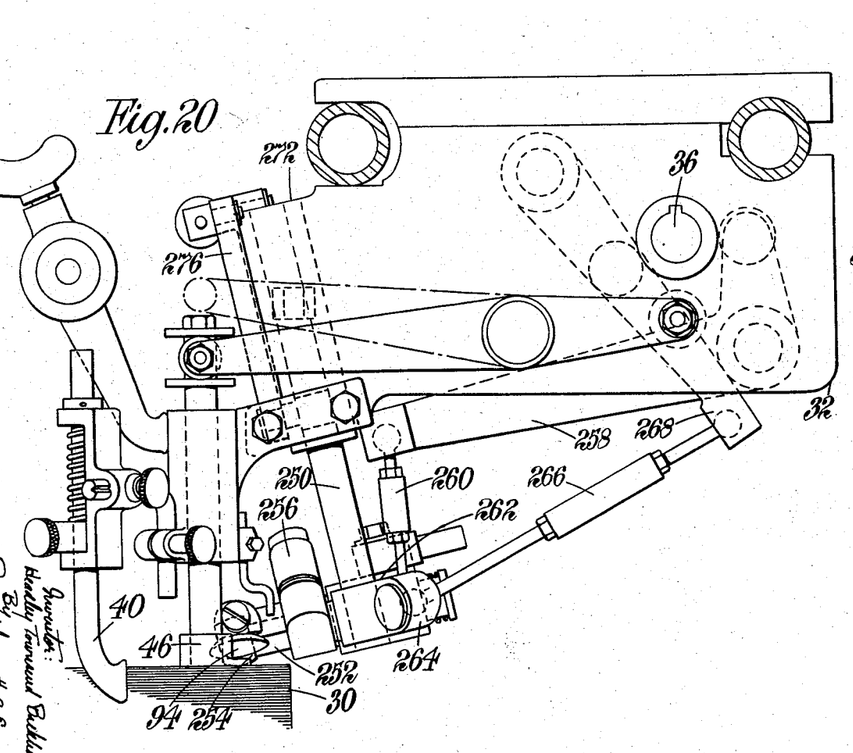
Figure 20 is a side view, corresponding to Figure 9, of a further modified construction.
Figure 21:
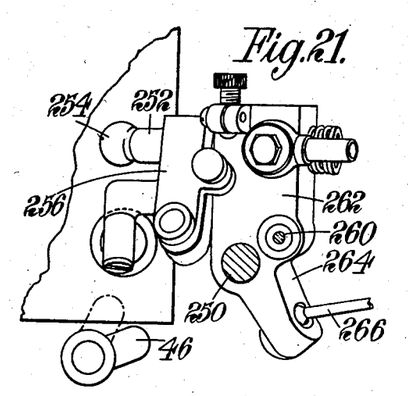
Figure 21 is a plan view of part of the mechanism shown in Figure 20.
Figure 22:
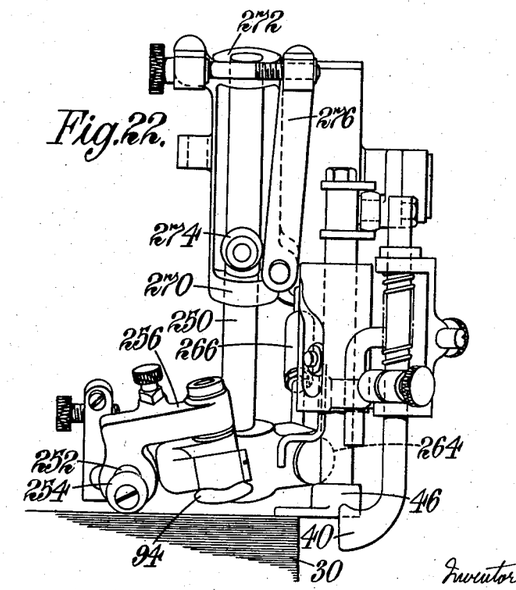
Figure 22 is a front view of the mechanism shown in Figure 20.

In a third modification (shown in Figures 20–22) the backwards and forward movements of the separating gripper 94 are effected by rotation about a nearly vertical axis. There is a rod 250 which extends upwardly and forwardly and is guided for axial movement as later described. Secured to the lower end of the rod and offset from its axis (which is the above-mentioned nearly vertical axis of rotation) there is a stub shaft 252 which carries a stop or bead 254 at its front end and also has pivoted to it an arm 256 which carries the suction gripper. A piston and cylinder are provided and arranged to effect upward movements of the gripper by rotation of the arm about the stub shaft 252. The up and down movements of the rod 200, stop 254 and gripper 94 are effected by a bell-crank lever 258 which is rocked by a cam on the shaft 36 and connected by a link 260 to a bracket 262 on the lower end of the rod, the link having universal joints to the bracket and the lever. Connected to an arm 264 extending from the bracket 262 there is another link 266 with universal joints to a cam-rocked lever 268. The lever 268 is arranged positively to rotate the rod 250 and bracket 262 in the direction (clockwise in Figure 21) to move the gripper 94 towards the centre of the rear edge of the pile and then backwardly clear of the pile. The return movement is effected by spring means. The upper end of the rod 250 is guided for axial movement in guideways 270—272 in the main bracket 32 and on the side of the rod between the guideways there is a roller 274. At one side of the rod there is a guide-bar 276 on which the roller rubs when the gripper has been returned to its operative position by the spring. The guide-bar, which is adjustable by a screw 278, slopes upwardly and outwardly and as the gripper 94 is lifted by the lifting cam and lever 258 the guide-bar permits the spring to move the gripper 94 outwardly (i. e. away from the opposed gripper) by rotation of the rod and thereby to tauten the sheet.

In each of the arrangements above described the initial lift by the upward movement of the suction gripper when its mouth is sealed, bends the sheet about the stop or bead. As may be seen in Figure 13 for example, the lifting movement of the gripper is in an arc centred above the top of the sheet (e. g. on the axis of the bead) and the effect is that as the sheet is bent around the head there is a tendency to stretch the sheet between the gripper and the bead. This tendency results from the wrapping of the sheet around the bead and the consequential reduction in the length of the sheet between the gripper and the point at which the sheet leaves the bead. In some cases (e. g. when the sheets are of suitable material) the tendency may be employed to effect an initial stretching of the back of the sheet between the beads, the sheet being pulled around the beads, which may be mounted on needle bearings for rotation. In other cases it may be desirable to permit some degree of movement of the gripper towards the bead to compensate for the stretching action. If resilient means resisting such movement are provided a combination of both these results may be obtained. Two constructions in which movement of the gripper in this way is permitted will now be described. The arrangement embodied in the first example and already described permits movement of the gripper in this way. That is to say the arm 92 carrying the gripper 94 being rotatable about an upright axis as described, the gripper may move inwardly towards the bead 120 and the spring 96 by resisting such movement maintains tension on the sheet.

In an alternative to the stretching arrangement just referred to there is a short suction tube extending radially from the stub shaft aforesaid and a sleeve slidable along the tube. The sleeve carries the gripper and is urged outwardly from the shaft by a spring around the tube. A guide pin on the tube working in a slot in the sleeve limits the movements of the sleeve and prevents rotation thereof.

Various modifications may be made in the above examples.

For instance there may be provided, at the centre of the pile, an air blast nozzle which is fixed above the pile and is arranged to blow air beneath a sheet during a part of the forwarding thereof. Changeover valve means may be provided by which the air is transferred, at appropriate times, from the centre stop foot nozzle to the fixed nozzle and back again. The blast may be changed from the foot nozzle to the fixed nozzle shortly after forwarding of the sheet is begun and be returned to the foot nozzle just before the end of the forwarding movement, the blast then being cut off.

When the machine is to be used on stiff sheets such as card, the corner fluffing air blasts may be omitted and the lifting suction grippers lowered directly into contact with the top sheet.

It is preferred that the centre air blasts have a wide angle.

It is a feature of the machines described in the above examples that at no time is the second sheet uncontrolled by a stop or foot. The corner stops, the centre foot and the stops or beads associated with the lifting grippers all contribute to this end.

In the above example the lifting suction grippers have a rearward, downward and then forward motion around and underneath the raised rear edge of the sheet, into engagement with the underlying sheet before forwarding of the raised sheet is begun.

In a modification the lifting gripper, operating near the rear edge, moves outwardly downwardly and inwardly around the side edge of the sheet.

In a further modified form the lifting gripper moves rearwardly to clear the rear edge of the raised sheet and then moves downwardly and forwardly to engage the next sheet. The path of the latter movement may be straight but is preferably curved with an increasing downward component so that the final engagement with the sheet is effected substantially perpendicular thereto. The forwarding of the sheet is begun substantially simultaneously with the beginning of the downward movement and the gripper does not move in beneath the raised sheet but follows up its forwarding movement. In one timing of this modification the lifting gripper transfers the lifted sheet to the stationary holding grippers at 220°, moves rearwardly between 220° and 280° clear of the back edge, the forwarding of the sheet begins at 280° and at 300° the lifting gripper with its stop begins to move forwardly, following up the sheet, and downwardly onto the pile, the stop engaging the pile at 360°.

I claim:

1. A machine for separating and forwarding sheets one by one from the top of a pile comprising sheet holding means above the rear of the pile operative to hold a raised rear edge portion of a sheet stationary above the pile for a pre-set period, a lifting gripper which engages and grips the rear edge portion of the sheet to be separated and means for moving the lifting gripper in a path in which it rises carrying the rear edge portion of the sheet, transfers the edge portion so lifted to the holding means and then moves rearwardly, downwardly and forwardly around the rear edge of the lifted sheet while the edge is held stationary as aforesaid to engage the next sheet beneath the said lifted edge portion.

2. A machine for separating sheets one by one from the top of a pile comprising sheet holding means above the rear of the pile operative to hold a raised rear edge portion of a sheet stationary above the pile for a pre-set period, a lifting gripper which engages and grips the rear edge portion of a sheet to be separated and means for moving the lifting gripper in a path in which it rises carrying the rear edge portion of the sheet, transfers the lifted edge portion to the holding means and then moves outwardly, downwardly and inwardly around the edge of the lifted sheet while the edge is held stationary as aforesaid to engage the next sheet beneath the said lifted edge portion.

3. A machine as claimed in claim 2 and including forwarding gripper means which take the lifted sheet portion from the holding means and move forwardly therewith over the pile.

4. A machine as claimed in claim 2 in which the means for moving the lifting gripper in the path aforesaid comprise an upright guideway and, attached to the lifting gripper, means co-operating with the guideway for guiding the gripper for up and down movements, the guideway being pivotally supported about a transverse axis, means for moving the gripper up and down the guideway and means for swinging the guideway about its axis to effect the outward and inward movements of the gripper.

5. A machine as claimed in claim 2 in which the means for moving the lifting gripper in the path aforesaid comprises mechanical means for moving the gripper up and down and suction operated means for moving the gripper in and out, the two means operating in timed relation to effect the lifting of the sheet and the return movement of the gripper around and under the lifted edge of the sheet.

6. A machine as claimed in claim 2, in which the means for moving the lifted gripper in the path aforesaid comprise a suction operated piston and cylinder for effecting the in and out movements of the gripper, an upwardly extending guideway constraining the gripper and the piston and cylinder for up and down sliding movements as a unit and mechanical means for moving the unit up and down the guideway.

7. A machine as claimed in claim 2 and including an arm on which the lifting gripper is carried and which is pivoted about an upright axis outside the compass of the pile, means for effecting partial rotation of the arm to move the gripper in and out and means for moving the gripper up and down, the two means operating in timed relation to effect the lifting of the sheet and the return movement of the gripper around the edge of the lifted sheet.

8. A machine as claimed in claim 2 in which there are two lifting grippers each as aforesaid, the two grippers being spaced apart across the rear of the pile, suction means for effecting an initial lifting of each gripper when it engages a sheet and two stops positioned adjacent the two grippers respectively and between the grippers, the stops being arranged to rest on the top sheet so that the grippers during their initial lifting movement tend to bend the sheet around the stops and also tend to stretch the sheet by drawing it around the stops.

9. A machine as claimed in claim 2 comprising two lifting grippers as aforesaid arranged to operate respectively at the rear corners of the sheets, two stop feet, means for moving the two feet in beneath the two rear corners of the top sheet respectively, after the corners have been lifted, and downwardly to seat on the remainder of the pile to hold the pile during further elevation of the rear of the sheet and for elevating the feet from the pile in time for separation of the rear corners of the next sheet and an intermediate stop which moves in, under the lifted sheet, between the lifting grippers and seats on the underlying pile during at least a part of the time when the corner stop feet are raised from the pile.

10. A machine as claimed in claim 9 and including two upwardly extending rods on which the feet are mounted offset from the axis thereof and the means for moving the feet operate by effecting up and down movements of the rods to raise and lower the feet and rotary movements of the rods to move the feet in and out over the pile.

11. A machine as claimed in claim 10 and including nozzles for air blasts for fluffing up the uppermost sheets before the top sheet is engaged by the lifting grippers, the rods operating as valves in air conduits leading to the nozzles to control the air supply to the nozzles, the air being turned on when the feet are raised from the pile and turned off as the feet are lowered on to the pile.

12. A machine for separating and forwarding sheets one by one from the top of a pile comprising separating means operable to separate and lift from the pile an edge portion of the top sheet of the pile, means for holding the sheet portion so lifted above the pile, means for effecting separation of the separating means beneath the sheet portion so held to begin the separation and lifting of the corresponding edge portion of the next sheet of the pile and means for forwarding the first mentioned sheet over the pile when the separation of the said next sheet has begun.

References Cited in the file of this patent

UNITED STATES PATENTS

| | | |
|---|---|---|
| 1,585,368 | Blaine | May 18, 1826 |
| 1,777,225 | Rockstroh | Sept. 30, 1930 |
| 2,085,612 | Spiess | June 29, 1937 |
| 2,086,577 | Reinartz | July 13, 1937 |
| 2,108,702 | Backhouse | Feb. 15, 1938 |
| 2,214,088 | Seybold | Sept. 10, 1940 |
| 2,215,458 | Backhouse | Sept. 24, 1940 |
| 2,406,766 | Harrold | Sept. 3, 1946 |
| 2,454,762 | Belluche | Nov. 30, 1948 |
| 2,476,577 | Backhouse | July 19, 1949 |

UNITED STATES PATENT OFFICE

CERTIFICATE OF CORRECTION

Patent No. 2,869,867                                                              January 20, 1959

Headley Townsend Backhouse

It is hereby certified that error appears in the printed specification of the above numbered patent requiring correction and that the said Letters Patent should read as corrected below.

Column 12, line 8, for the word "separation" read -- operation --.

Signed and sealed this 12th day of May 1959.

(SEAL)
Attest:

KARL H. AXLINE                                                   ROBERT C. WATSON Attesting Officer                                              Commissioner of Patents